US009026906B2

(12) United States Patent
Mathai et al.

(10) Patent No.: US 9,026,906 B2
(45) Date of Patent: May 5, 2015

(54) OUTPUT PREVIEW FOR A USER INTERFACE

(75) Inventors: Jackson Mathai, Heidelberg (DE); Johan Christiaan Peters, Sankt Leon-Rot (DE)

(73) Assignee: SAP SE, Walldorf (DE)

( * ) Notice: Subject to any disclaimer, the term of this patent is extended or adjusted under 35 U.S.C. 154(b) by 749 days.

(21) Appl. No.: 12/642,481

(22) Filed: Dec. 18, 2009

(65) Prior Publication Data
US 2011/0154194 A1    Jun. 23, 2011

(51) Int. Cl.
G06F 3/048    (2013.01)
G06F 17/21    (2006.01)
G06F 9/44    (2006.01)

(52) U.S. Cl.
CPC ............ G06F 17/212 (2013.01); G06F 9/4443 (2013.01)

(58) Field of Classification Search
CPC .................................................... G06F 17/212
USPC .................... 715/273, 764, 769, 780
See application file for complete search history.

(56) References Cited

U.S. PATENT DOCUMENTS

| | | | | |
|---|---|---|---|---|
| 6,332,149 B1 * | 12/2001 | Warmus et al. | | 715/246 |
| 7,385,712 B2 * | 6/2008 | Nakagiri et al. | | 358/1.12 |
| 8,095,877 B1 * | 1/2012 | Szonn et al. | | 715/274 |
| 8,108,763 B2 * | 1/2012 | Gao et al. | | 715/209 |
| 2001/0051964 A1 * | 12/2001 | Warmus et al. | | 707/530 |
| 2003/0140315 A1 * | 7/2003 | Blumberg et al. | | 715/527 |
| 2005/0229109 A1 * | 10/2005 | Haley | | 715/780 |
| 2008/0144097 A1 * | 6/2008 | Yoshida | | 358/1.15 |
| 2009/0070693 A1 * | 3/2009 | Mosquera et al. | | 715/764 |
| 2009/0110306 A1 * | 4/2009 | Yamauchi et al. | | 382/232 |
| 2010/0177346 A1 * | 7/2010 | Mita | | 358/1.15 |
| 2010/0290087 A1 * | 11/2010 | Van Hoof et al. | | 358/1.15 |
| 2011/0035759 A1 * | 2/2011 | Williams et al. | | 719/328 |
| 2011/0078566 A1 * | 3/2011 | Robertz | | 715/274 |
| 2012/0204095 A1 * | 8/2012 | Gao et al. | | 715/234 |

OTHER PUBLICATIONS

Side Views: Persistent, On-Demand Previews for Open-Ended Tasks by Terry et. al (2002 ACM).*
Microsoft® Word 2007 Bible by Herb Tyson John Wiley & Sons Mar. 12, 2007 (Word).*

* cited by examiner

Primary Examiner — William Bashore
Assistant Examiner — Nathan Shrewsbury
(74) Attorney, Agent, or Firm — Schwegman Lundberg & Woessner, P.A.

(57) ABSTRACT

A method and system to generate a user interface for an application, the user interface including a plurality of screen items, and each screen item being rendered based on associated screen item data. An output preview is generated and includes at least one preview item representative of a corresponding one of the plurality of screen items. Each preview item in the output preview is linked to the screen item data associated with the corresponding screen item, and is rendered in the output preview based on the linked screen item data.

22 Claims, 13 Drawing Sheets

OUTPUT PREVIEW FOR A USER INTERFACE

TECHNICAL FIELD

The present application relates generally to a method and system to display output previews in computer applications, and to provide a preview of images prior to the output thereof e.g. via printing, faxing, or e-mail. In particular, the present application relates to a method and system to generate a user interface for a computer application, the user interface including an output preview functionality.

BACKGROUND

Computer applications often include an output preview functionality to preview the results of output via a particular output mode. For example, for content output via printing, applications may provide a print preview functionality to display a preview of pages that are about to be printed, allowing a user to see what the pages will look like when they are printed.

Such preview functionalities are typically rasterized images or snapshots of content which is to be outputted, e.g. via printing. If a user is not satisfied with the previewed output, a base document on which the output preview is based may be altered to achieve a desired output.

SUMMARY

According to one embodiment there is provided a method comprising: generating a user interface for an application, the user interface including a plurality of screen items, each screen item being rendered based on associated screen item data; and generating an output preview which includes at least one preview item representative of a corresponding one of the plurality of screen items, the at least one preview item being linked to the screen item data associated with the corresponding screen item and being rendered in the output preview based on the linked screen item data.

The at least one preview item may be linked to the corresponding screen item data by a pointer, a hotlink, a placeholder, or the like, to permit population of the output preview with the corresponding screen item data. In an example embodiment, the screen item data which is accessed to render preview items in the output preview is stored in a database which provides the screen item data also to the user interface, so that a particular screen item and its corresponding preview item is rendered based on common screen item data located in a common database.

The output preview may be displayed in response to receiving user input indicative of a selected output mode, the output preview being with respect to the selected output mode. To this end, the user interface includes a plurality of output mode objects associated with respective output modes, the user input indicative of the selected output mode comprising dragging a selected screen item and dropping the selected screen item on the output mode object associated with the selected output mode. In an example embodiment, the output mode objects may be in the form of soft buttons or designated areas in the user interface. Each output mode object may include an indicator, such as a colored indicating strip, to indicate that it is receptive of a screen item to produce an output preview. The method may thus include user selection of an output mode prior to generation and/or display of the output preview.

The output preview may be one of a print preview, a fax preview, or an e-mail preview. The user interface may provide each of these options, so that the user interface may provide faxing, printing and e-mailing as optional output modes. Further output modes for which a preview may be provided may include output to a projector, another display device, or the like.

The output preview may be provided in an output preview tray forming part of the user interface, the method further comprising adding preview items to the output preview in response to receiving user input indicative of the addition of corresponding screen items to the output preview tray. Once the output preview tray is displayed, e.g. in response to dragging and dropping of a screen item on to one of the output mode objects, further screen items may be added by, for example, dragging and dropping such further screen items on to the output preview tray, resulting in automatic rendering of corresponding further preview items in the output preview. The output preview tray may thus be integrated with the user interface, so that screen items may be added to the output preview tray without requiring user navigation between applications or user interfaces of different applications.

With "tray" is meant an area, zone or window in the user interface, an "output preview tray" being an area, zone or window in the user interface designated specifically for display of an output preview. The output preview tray may, in one embodiment, be generated only upon selection of a particular output mode. The output preview tray may have a fixed location in the user interface, or may, instead be movable in response to user input, thus functioning as a floating window. The size of the tray in the user interface may be selectively altered by a user.

The output preview may be editable, permitting user rearrangement of relative positioning of a plurality of preview items in the output preview. The method may further comprise receiving user inputted text in the output preview tray, and generating user inputted text as part of the output preview.

The user interface may be a markup language-based user interface, the method further comprising automatically generating an output document in response to user selection for output of one of the plurality of screen items, the output document including the selected screen item, and the output preview being in respect of with respect to the output document. User selection for output of one of the plurality of screen items may be by dragging and dropping the selected screen item to an output mode object, e.g. a soft button associated with printing, faxing, or e-mailing.

The method may further comprise re-rendering the at least one preview item subsequent to initial rendering of the at least one preview item, the re-rendering being based on a current form of the linked screen item data. The output preview may thus be dynamic, in that changes to screen items for which there are corresponding preview items in the output preview may be reflected in the output preview, without requiring copying of changed or altered screen items, to the output preview. Preview items in the output preview may thus be updated, so that the preview items reflect the current form of the corresponding screen items. Such updating or re-rendering may be triggered by user input, for example by clicking of an update button in the output preview tray, or it may be performed automatically at predefined intervals or prior to the output of the output preview.

The method may further comprise storing the output preview as a output template or template document, to permit future application of the output template to another user interface. To this end, the output template may comprise code or data structures, such as e.g. XML placeholders or the like, to provide links to screen item data, and to identify respective screen item types of the preview items forming part of the output preview. Loading of the output template in another user interface or user interface page may thus trigger automatic population of the output template with respective associated screen item data, to generate an output document which is previewed in the output preview.

The output preview may be displayed in response to user selection of an output template, the at least one preview item being linked to the screen item data associated with the corresponding screen item by a data structure provided in the output template.

According to another embodiment there is provided a method comprising: generating a markup language-based user interface which includes a plurality of screen items; automatically generating an output document in response to user selection of one of the screen items for output; and generating, as part of the user interface, an output preview of the output document.

In such case, the output preview may include a preview item representative of a corresponding screen item, the preview item being rendered based on markup language screen item data associated with the screen item, the markup language screen item data being copied and pasted into an output tray in which the output preview is generated.

BRIEF DESCRIPTION OF DRAWINGS

Some embodiments are illustrated by way of example and not limitation in the figures of the accompanying drawings in which.

In the Figures, like numerals refer to like parts, unless otherwise indicated.

DETAILED DESCRIPTION

In the following description, for purposes of explanation, numerous specific details are set forth in order to provide a thorough understanding of some example embodiments. It will be evident, however, to one skilled in the art that a/the method and system may be practiced without these specific details.

Figure 1:
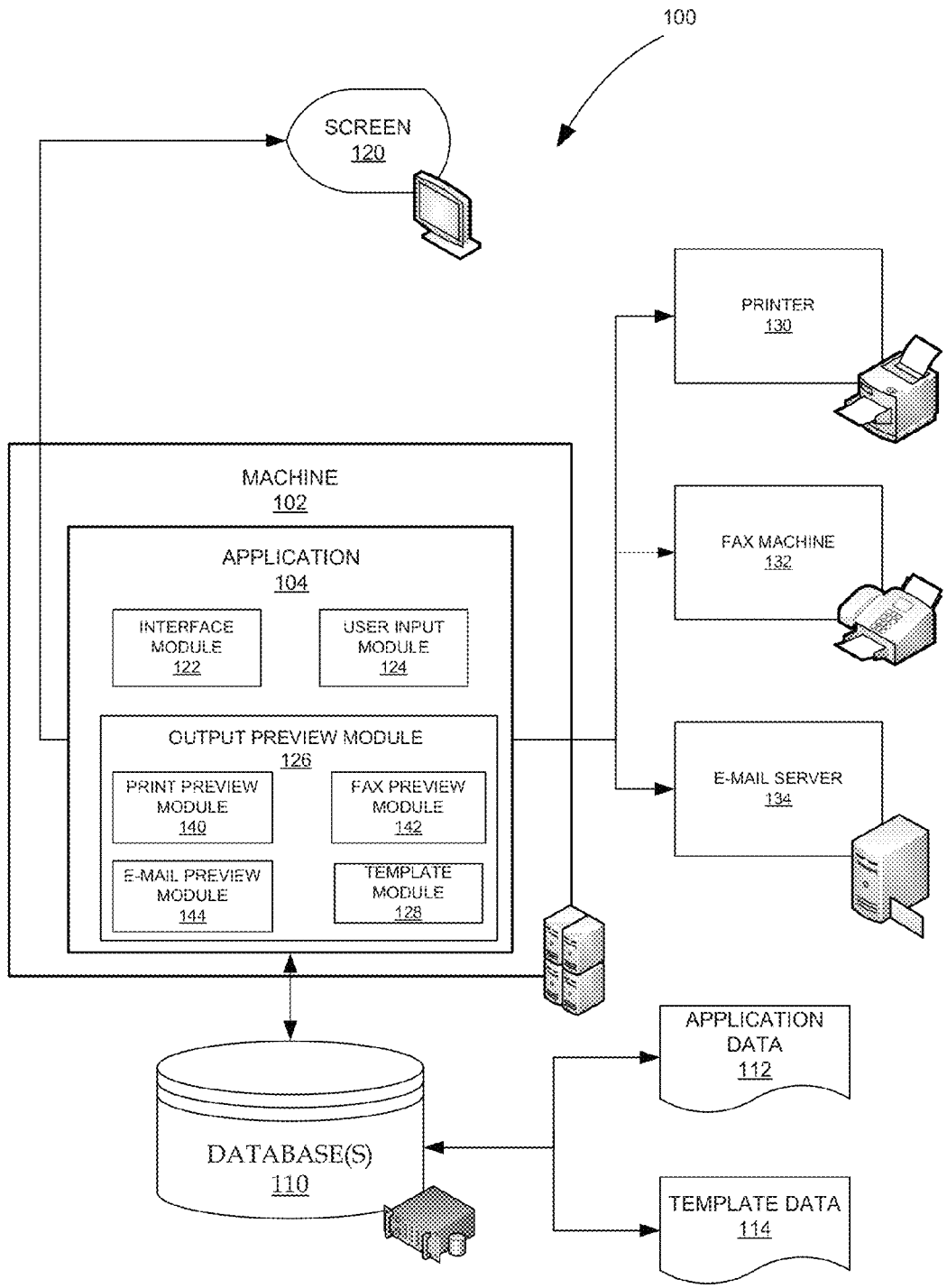
FIG. 1 is a schematic block diagram illustrating a system which provides a user interface including a dynamic output preview, according to an example embodiment.

FIG. 1 shows an example embodiment of a computer system 100 in accordance with an example embodiment. The computer system 100 includes a machine 102 (e.g., operating a client or server), in this example being a personal computer (PC). The machine 102 includes an application 104 for execution on one or more processors forming part of the machine 102. In the example embodiment of FIG. 1 the application 104 is an enterprise resource management application with client relation management functionality, but it is to be appreciated that the methodology described herein may be used in any application to which output preview functionality is applicable.

The application 104 includes a number of modules to perform respective functions of the application 104. The application 104 may include an interface module 122 to generate a user interface (UI), in this example a graphical user interface (GUI), and to deliver the user interface for display on a display device in the form of a screen 120 forming part of the computer system 100. A user input module 124 is provided to receive and process user input with respect to a user interface displayed on the screen 120. The user input module 124 may be arranged to receive user input regarding a selected output mode, e.g. whether printing, faxing, or e-mail. To produce such output, the computer system 100 optionally includes a printer 130, a fax machine 132, and an e-mail server 134 in communication with the machine 102. It is to be appreciated that, in other embodiments, other output devices may form part of the system 100, to provide additional and/or alternative output modes.

The application 104 further includes an output preview module 126 to generate and display an output preview in an output preview tray as part of the UI displayed on the screen 120. The output preview module 126 includes sub-modules for the respective output modes, in this example comprising a print preview module 140, a fax preview module 142, and an e-mail preview module 144.

Further, the application 104 includes a template module 128 for creating and managing output templates or template documents, each output template providing a pre-specified layout, configuration, or arrangement for an output document. In the example embodiment, the machine 102 is in communication with an off-site online database 110. The database 110 may include application data 112 such as enterprise resource information, client management information, as well as screen item data in the form of data structures for use by the interface module 122 in generation of a GUI. Such data structures may include, e.g., XML structures or tables for screen items to be displayed on the screen 120 as part of the GUI. Each screen item is to be rendered in the output preview based on the associated screen item data forming part of the application data 112. The database 110 may further include template data 114, which may comprise data structures, such as XML code or tables, for respective output templates. Although the database 110 is shown in the example embodiment of FIG. 1 to be located off-site, application data 112 and template data 114 may, in other embodiments, be stored in onboard memory forming part of the machine 102. A client-server architecture for providing online communication between a client machine such as the machine 102 of FIG. 1 and an enterprise application platform is described in greater detail below with reference to FIGS. 5 and 6.

Figure 2:
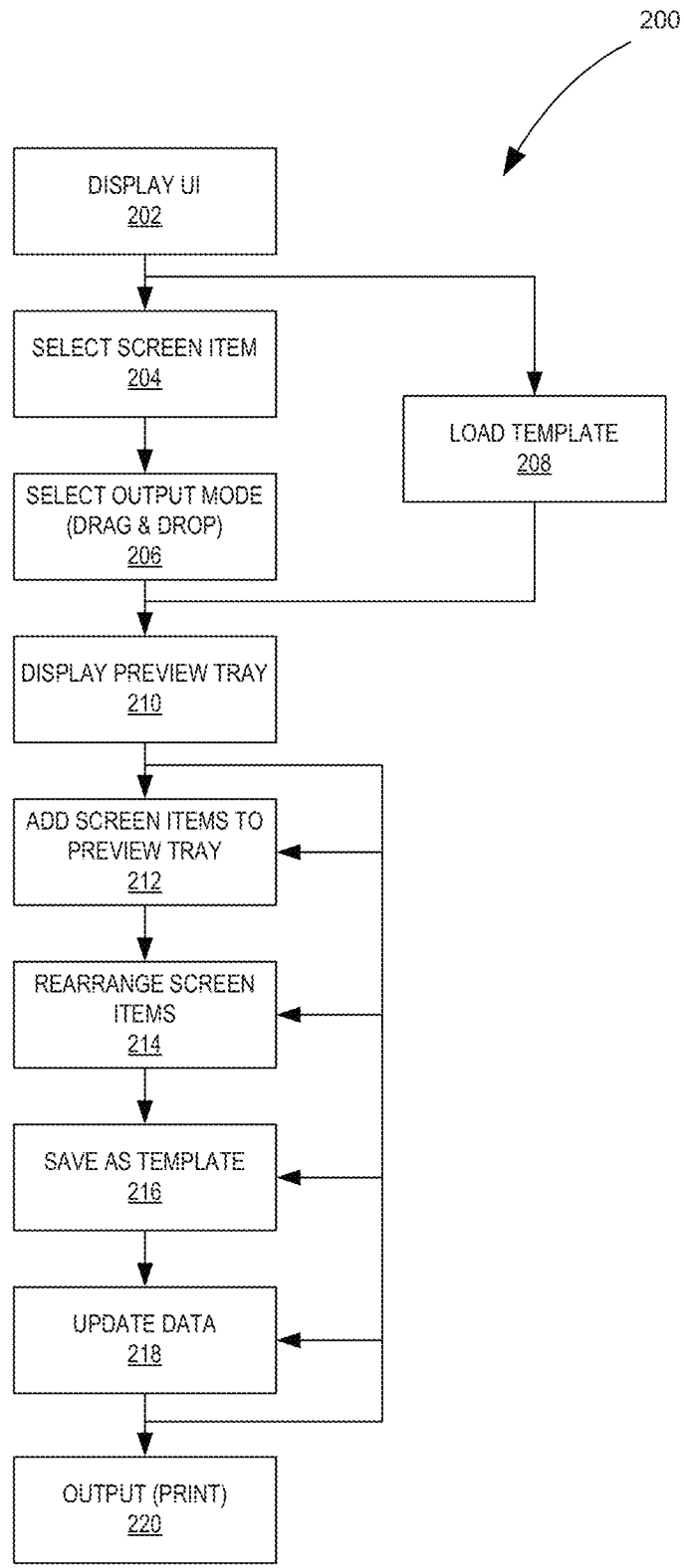
FIG. 2 is a flow chart of a method to provide an output preview in a user interface, as may be used in an example embodiment.
Figure 3A:
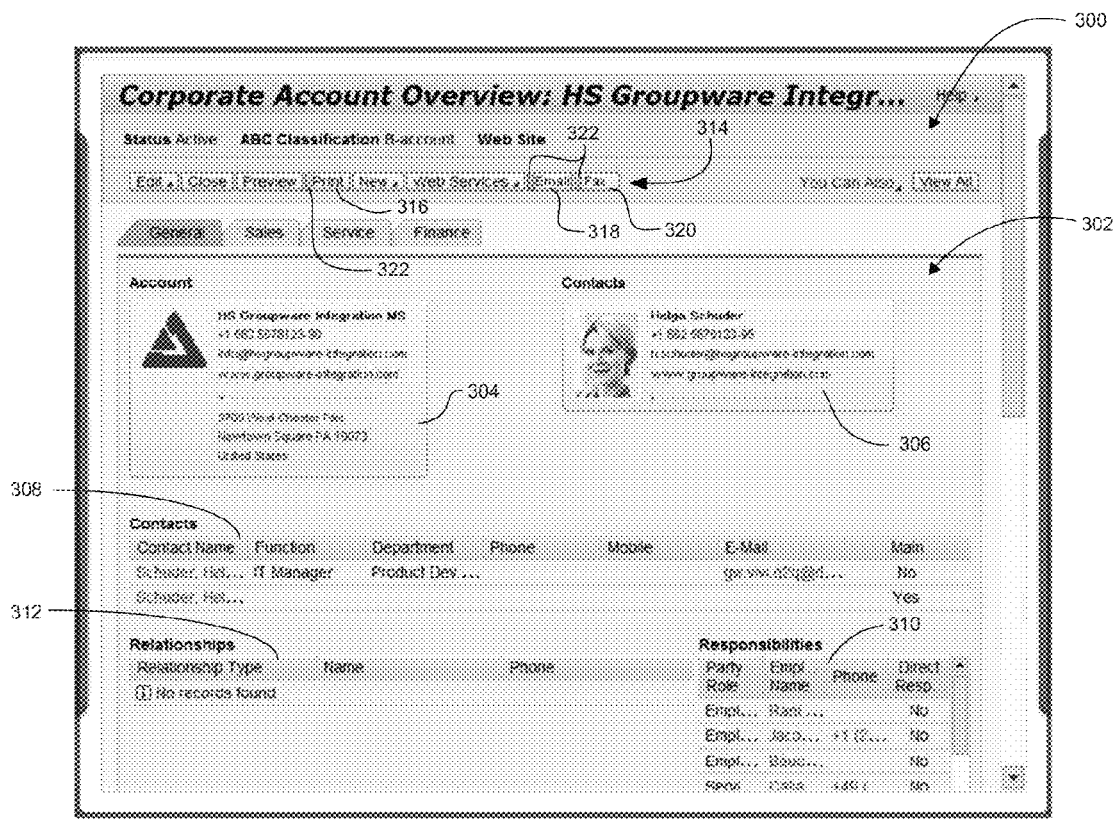
FIGS. 3A-3F are screenshots of a user interface which includes a dynamic editable print preview, according to an example embodiment.

In FIG. 2, reference numeral 200 generally indicates an example method executed on the machine 102. The example method 200 will be described with reference to a series of screen shots illustrated in FIGS. 3A-3F. First, a graphical user interface (GUI) is displayed, at operation 202. FIG. 3A shows an example GUI 300 displayed on the screen 120. In the present example, the GUI 300 comprises a page 302 of the customer relations management application, to display general information about a particular account. The page 302 includes a number of screen items, such as an account information item 304, a contact information item 306, a contacts table 308, a responsibilities table 310, and a relationship table 312. In the example embodiment, the GUI 300 is XML-based, and the screen items 304-312 are generated based on respective screen item data structures in the form of respective XML data structures hosted in the application data 112 of the database 110.

The XML data structures of the respective screen items 304-312 discriminate between items which are selectable for display in an output preview, as discussed in more detail below, and items which are not selectable for such display. XML code representative of each of the screen items 304-312 may thus include a selectability indicator to indicate whether or not the respective screen items 304-312 are selectable. During design of the layout for a page such as the general information page 302 illustrated in FIG. 3A, a designer may specify which the screen items 304-312 are selectable for inclusion in an output preview. A screen item 304-312 may further be coded such that it is selectable in its entirety and/or in part. Screen items 304-312 or parts thereof which are capable of receiving focus in the user interface may be user-selected for addition to the output preview. For example, when a screen item is a table such as screen items 308-310, a user may select the entire table, a selection of columns from the table, a selection of rows from the table, or a selection of cells from the table. Any screen item which is selectable is capable of being dragged and dropped through use of a cursor control device, such as a computer mouse.

The GUI 300 further includes a row of option soft buttons 314 that may be selected by a user for executing respective functions. Three of the option buttons are output mode objects for selecting respective output modes. The output mode objects comprise a print button 316, an e-mail button 318, and a fax button 320. Each of these three buttons may be selected to produce an output preview tray 330 (see FIG. 3C). To assist a user in identifying which of the buttons 314 displays an output preview tray 330 in response to its selection, the print button 316, the e-mail button 318, and the fax button 320 each includes a visual indicator in the form of a colored indicating strip 322 along one side of the button 316-302.

Figure 3B:
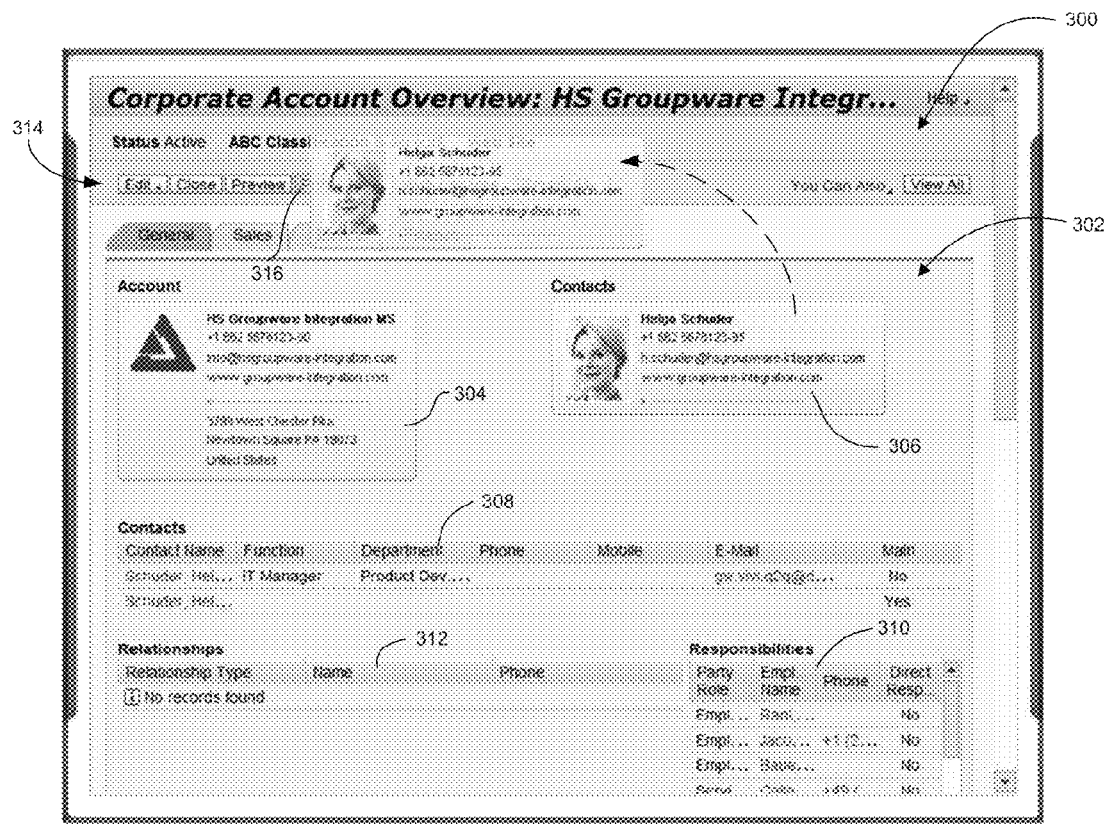

If a user wishes to produce an output which includes any of the screen items 304-312, a desired screen item 304-312 may be dragged and dropped to the appropriate output button 316, 318, or 320. FIG. 3B shows an example in which a user wishes to create and print a document including the contact information item 306. First, the screen item 306 is selected, at operation 204 (FIG. 2), by directing a screen cursor (not shown) to the screen item 306, and directing focus to the relevant screen item, e.g. by left clicking on the computer mouse. Thereafter, an output mode is selected, at operation 206 (FIG. 2), by dragging the screen item 306 to the output button of choice and releasing the mouse button to drop the screen item 306 on the selected output button, as illustrated by the dotted line in FIG. 3B. In the illustrated example, the screen item 306 is dragged and dropped to the print button 316.

Figure 3C:
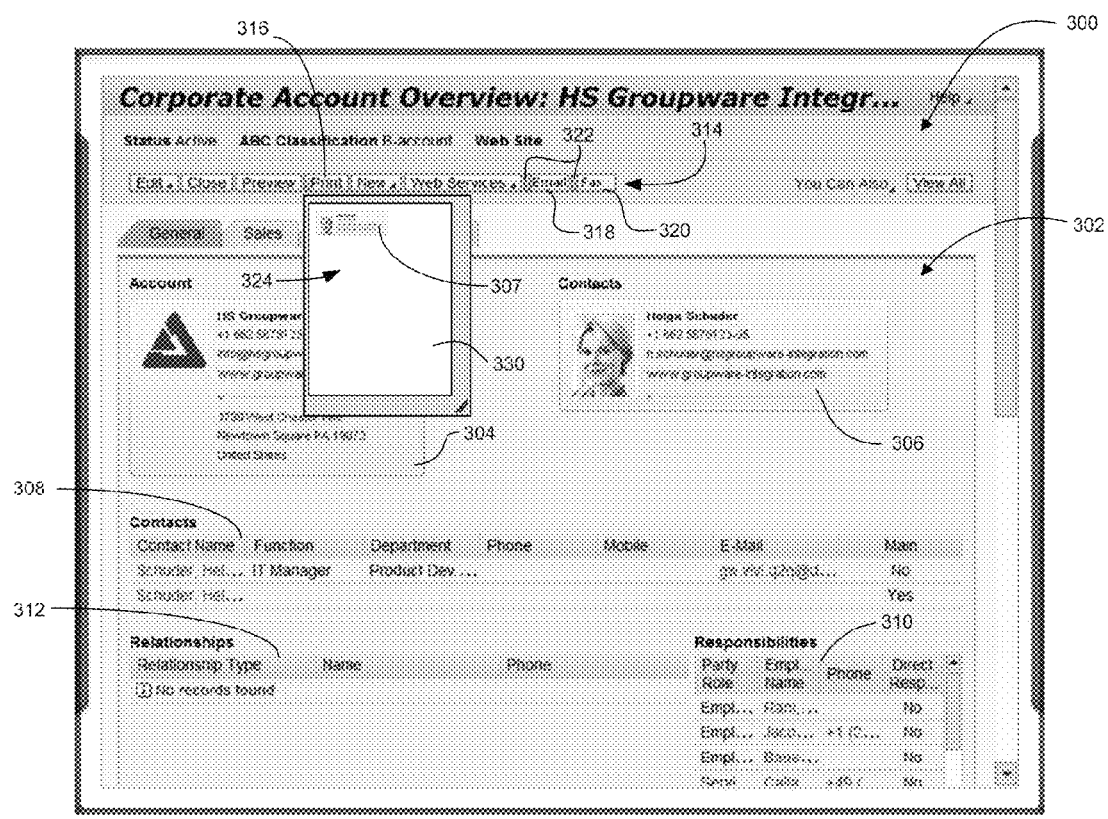
Figure 3D:
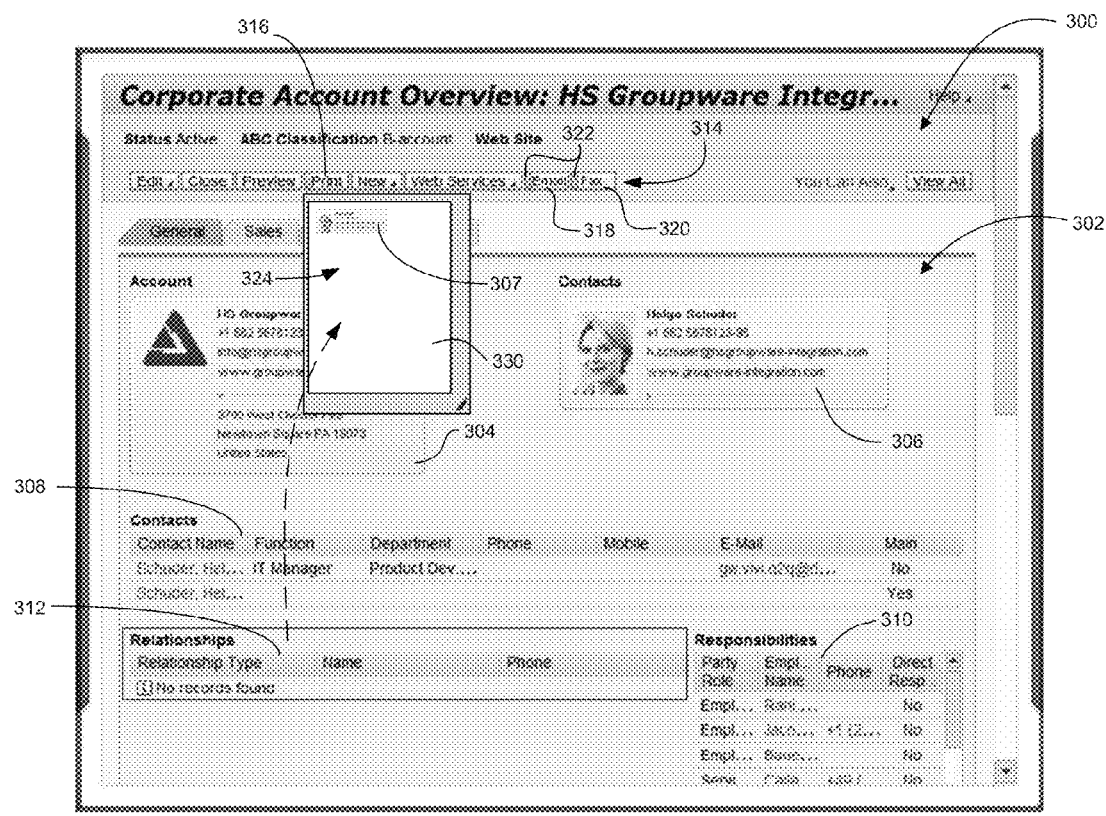

In response to selection of the output mode, as described above, the output preview tray, is automatically displayed, at operation 210 (FIG. 2). In the example embodiment, the output preview tray is a print preview tray 330 in the form of a fly-out window located immediately below the print button 320 (FIG. 3C). The print preview tray 330 provides a reduced size preview of an output document 324 automatically created or generated by dropping the contact information screen item 306 on the print button 316. In other embodiments, a print preview may be provided in the form of a floating window or the like. The output document 324 comprises a blank page on which is imposed in a preview item 307 representative of the corresponding screen item 306 which was dragged and dropped to the print button 316.

If, the user wishes to add further screen items 304-312 to the output document 324, such further screen items may be dragged and dropped on to the print preview tray 330, at block 212 (FIG. 2). For example, in an example illustrated FIG. 3D, the relationship table 312 is added to the previewed output document 324 by dragging and dropping the relationship table 312 to the output preview tray 330, resulting in the display of an associated preview item 313 in the print preview tray 330 (see FIG. 3E). In this example, preview items 307 and 313 are displayed in the output preview tray 330 in the order in which they were originally added to the output document 324, with the later added preview item 313 being displayed below the earlier added preview item 307.

Figure 3E:
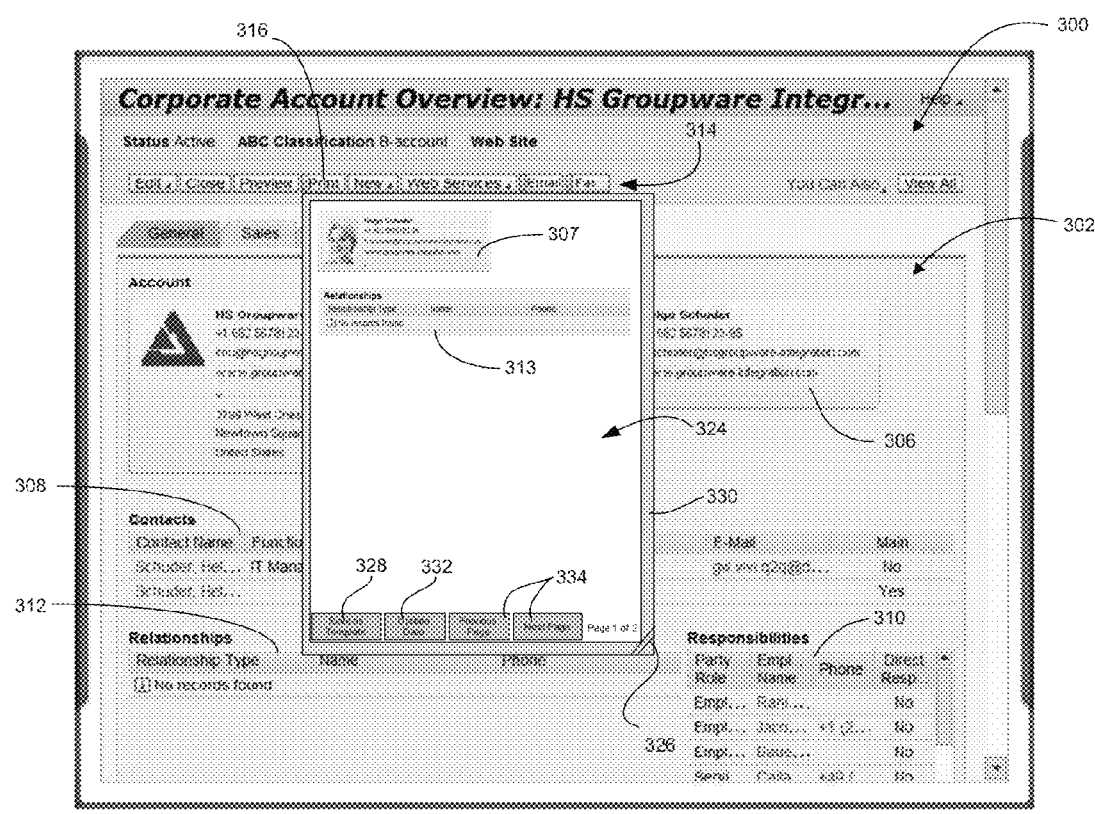
Figure 3F:
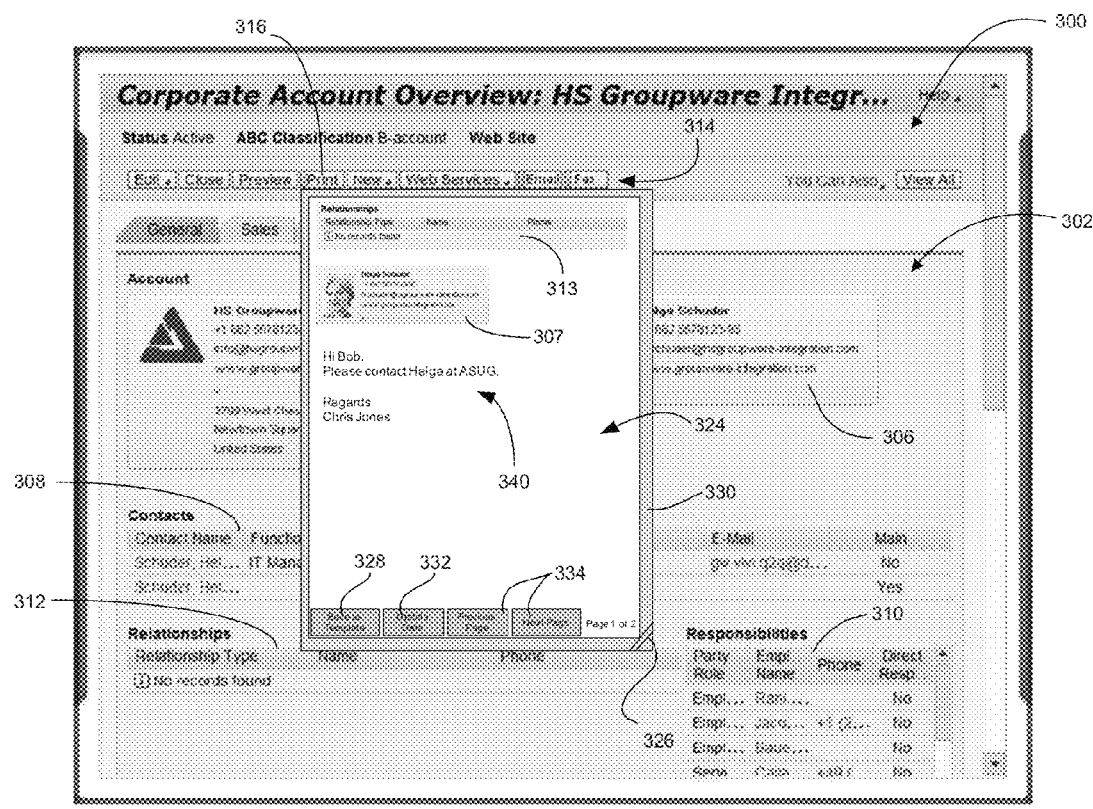

The output document 324 in the print preview tray 330 is interactive or editable, thus for example allowing the user to alter the arrangement and positioning of items in output document 324, at block 214 (FIG. 2). The preview items 307, 313 may thus e.g. be repositioned in the output document 324 by use of the cursor control device or, alternatively, by cut-and-paste or copy-and-paste functions via the cursor control device or keyboard inputs. FIG. 3F shows, for example, the results of rearranging the preview items 307 and 313, by dragging the relationship table preview item 313 and dropping it above the contact information preview item 307. The screen size of the print preview tray 330 is adjustable. To this end, the example output preview tray 330 is provided with a bottom corner 326 which may be grabbed and dragged to adjust the size of the tray 330.

In the example embodiment, each preview item 307, 313 in the output document 324 previewed in the tray 330 comprises a link or pointer to the underlying data, or screen item data, of the associated screen items 306, 312. The preview items 307, 313 are therefore not rasterized or bitmap images copied and pasted into the preview document, but are instead linked to the screen item data of the respective associated screen items 306, 312. Thus, preview item 307 is, for example, a rendering of the same XML data structure, XML definitions, and/or metadata underlying screen item 306. The output tray 330 may thus provide a dynamic preview of the output document 324, in that changes or alterations to screen items 306, 312 forming part of the previewed output document 324 may result in corresponding changes to the associated preview items 307, 313 of the output document 324, without having to repeat the operation of linking the screen items 306, 312 to the print preview tray 330 by dragging and dropping them on the tray 330.

It will be appreciated that, in other embodiments, preview items in an output preview tray may be rendered without being linked to the screen item data of the corresponding screen item. In such cases, the screen item data itself may be copied and pasted into the tray, so that rendering of the preview item is based on the copied and pasted screen item data. For example, if the user interface is markup language-based, for instance being an XML-based interface, dragging and dropping of a screen item will result in automatic copying of the XML screen item data into the tray, the XML screen item data being parsed in the tray to render the preview item. In such an embodiment, the output preview will not be dynamic, as alteration or editing of the underlying screen item data will not be reflected in the corresponding screen item unless the screen item is re-copied to the tray.

To facilitate display in the print preview tray 330 of preview items 307, 313 which are representative of the associated screen items 306, 312 in their latest or current form, the print preview tray 330 includes an update button 332 in the form of a soft button forming part of a row of soft buttons located at the bottom of the print preview tray 330. In response to selection of the update button 332, the preview items 307, 313 forming part of the output document 324 are re-rendered with reference to the underlying data, e.g. the underlying XML code and/or metadata forming part of the application data 112, thereby updating the data in the print preview tray 330, at block 218 (FIG. 2).

The row of soft buttons also includes page navigation buttons 334 to permit user navigation between preview pages if the output document 324 consists of more than one page.

The output document 324 created in the output preview tray 330 may be saved as an output template, or template document, at block 216 (FIG. 2). Saving the output document 324 as a template permits later use of the template either in the same page where the template was created, or in any other page or location in the application 104. In the example embodiment, data representative of the format, layout, and/or arrangement of screen items in the output document 324 is saved in the template data 114 of the database 110 (FIG. 1). It will be appreciated that the underlying screen item data of each of the screen items 304-312 may include an identifier as part of its code and/or metadata, to identify a class or type of the screen item 304-312. A template data structure for a particular template may thus include data indicative of the type or class of screen items forming part of the template, together with the arrangement or positioning of the respective screen items in the template.

If a user wishes to apply a saved template to another page in the application 104, display of the print preview tray 330 may be triggered by loading the template, at block 208 (FIG. 2), instead of dragging and dropping a screen item to the print button 316. The template module 128 (FIG. 1) then loads the saved template, and the print preview module 140 generates a preview of an output document in the print preview tray 330. If, for example, the template exemplified with reference to FIG. 3E is applied to a particular page, the print preview tray 330 will generate an output document comprising a preview item for a contact information screen item of the particular page, followed by a relationship table screen item of the particular page.

The output document 324 is further editable in that it is capable of receiving focus and provides functionality for receiving text 340 (FIG. 3F). Selection of the output tray 330 by use of the cursor control device may trigger the display of a text cursor (not shown) in the preview of the output document 324, permitting the input of text 340 directly into the print preview tray 330. The print preview tray 330 thus provides a text editor. The print preview tray 330 can also, in conventional fashion, receive and display a variety of objects, other than screen items forming part of the user interface 300 and text 340. Standard format image files, such as JPEG files, may for instance be copied and pasted into the output document 324. An insertion point for the pasting of such objects may be selected by use of the cursor control device.

When the user is satisfied with the format of the output document 324 displayed in the print preview tray 330, the output document 324 may be outputted, at block 220 (FIG. 2). To this end, the user may initiate a print job by pressing the print button 316. In response to pressing of the print button 316, a conventional print dialog box (not shown) is displayed, allowing the user in standard fashion to select or confirm the particular printer which is to process the print job, to alter the properties of the document which is to be printed, to select a page range, etc. Upon user confirmation of the print job in the print dialog box, the output document 324 is printed by the printer 130 (FIG. 1).

Figure 4:
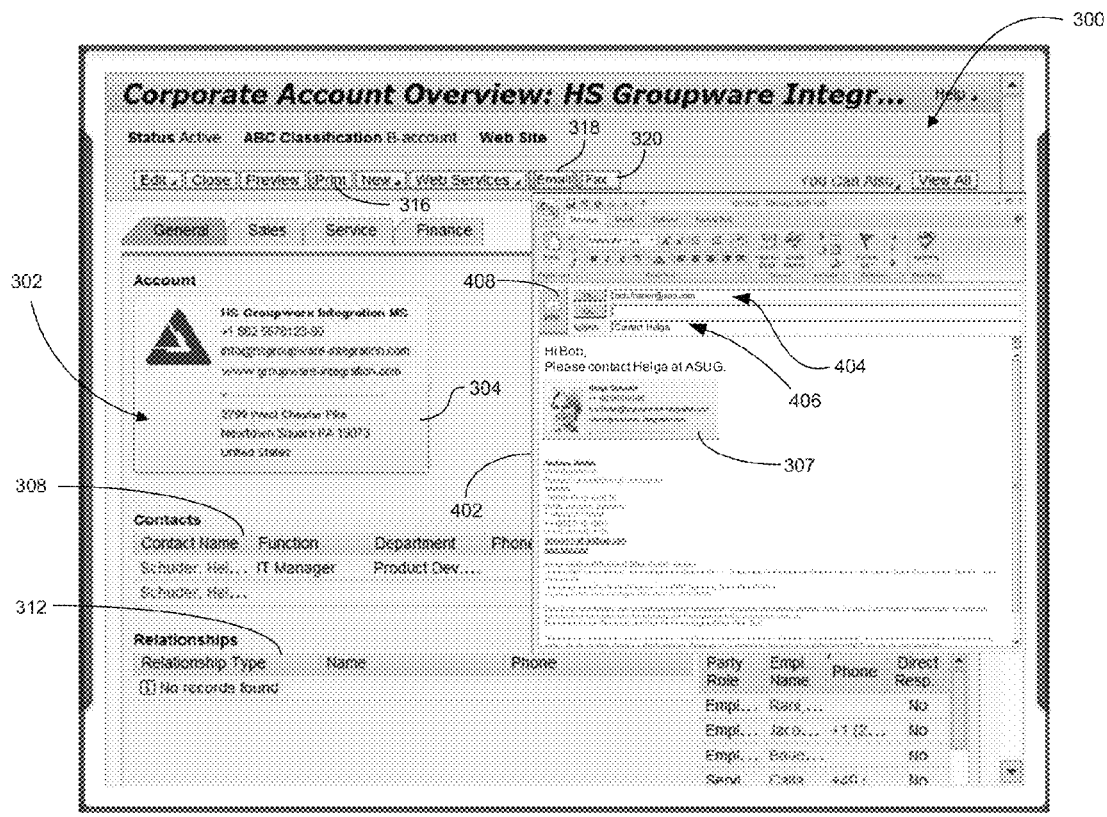
FIG. 4 is a screenshot of a user interface which includes a dynamic editable e-mail preview, according to an example embodiment.

Output preview trays in the form of a fax preview tray (not shown) and an e-mail preview tray 402 (FIG. 4) function in a manner substantially similar to the print preview tray 330 described with reference to FIG. 3A-3F. For example, if a user selects e-mail as output mode, for instance by dragging and dropping a screen item on to the e-mail button 318, the e-mail preview tray 402 is automatically displayed. In the example embodiment, the e-mail preview tray may be integrated with an e-mail application such as Microsoft Outlook™. The e-mail preview tray 402 may thus receive input regarding e-mail recipients 404, a message subject 406, and the like. Similar to the print preview tray 330 (FIG. 3A) described above, a preview item 307 displayed in the e-mail preview tray 402 may comprise a link to underlying markup language data of the corresponding screen item 306, the preview item 307 being rendered in the e-mail preview tray 402. To send the document previewed in the e-mail preview tray 402, the user may click either a send button in the e-mail preview tray 402, or click the e-mail button 318.

Figure 5:
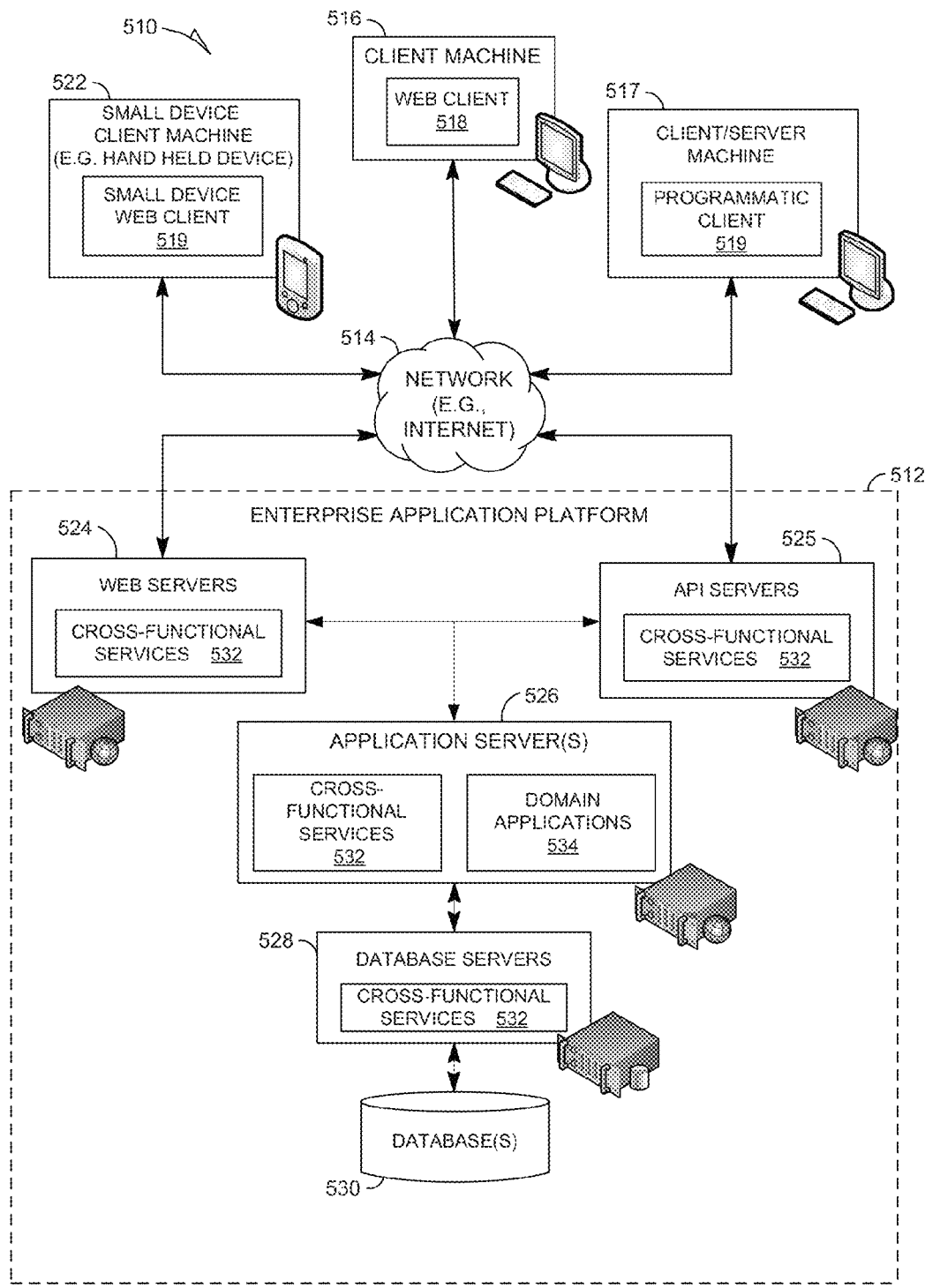
FIG. 5 is a schematic block diagram illustrating an enterprise application system, according to an example embodiment.

A further example embodiment will now be described with reference to an enterprise application platform. FIG. 5 is a network diagram depicting a system 510 in accordance with the further example embodiment, the system 510 having a client-server architecture. A platform (e.g., machines and software), in the example form of an enterprise application platform 512, provides server-side functionality, via a network 514 (e.g., the Internet) to one or more clients. FIG. 5 illustrates, for example, a client machine 516 with web client 518 (e.g., a browser, such as the INTERNET EXPLORER browser developed by Microsoft Corporation of Redmond, Wash. State), a small device client machine 522 with a small device web client 519 (e.g., a browser without a script engine) and a client/server machine 517 with a programmatic client 519. The client/server machine 517, with its programmatic client 519, may in certain embodiments provide functionalities and/or architecture similar to those of machine 102 and application 104 described with reference to FIG. 1.

Turning specifically to the enterprise application platform 512, web servers 524, and Application Program Interface (API) servers 525 are coupled to, and provide web and programmatic interfaces to, application servers 526. The application servers 526 are, in turn, shown to be coupled to one or more database servers 528 that facilitate access to one or more databases 530. The databases 530 may, in certain embodiments, correspond to the database(s) 110 described with reference to FIG. 1. The web servers 524, Application Program Interface (API) servers 525, application servers 526, and database servers 528 host cross-functional services 532. The application servers 526 further host domain applications 534.

The cross-functional services 532 provide services to users and processes that utilize the information enterprise application platform 512. For instance the cross-functional services 532 provide portal services (e.g., web services), database services and connectivity to the domain applications 534 for users that operate the client machine 516, the client/server machine 517 and the small device client machine 522. In addition, the cross-functional services 532 provide an environment for delivering enhancements to existing applications and for integrating third party and legacy applications with existing cross-functional services 532 and domain applications 534. Further, while the system 510 shown in FIG. 5 employs a client-server architecture, the present invention is of course not limited to such an architecture, and could equally well find application in a distributed, or peer-to-peer, architecture system, or in a standalone computer.

Figure 6:
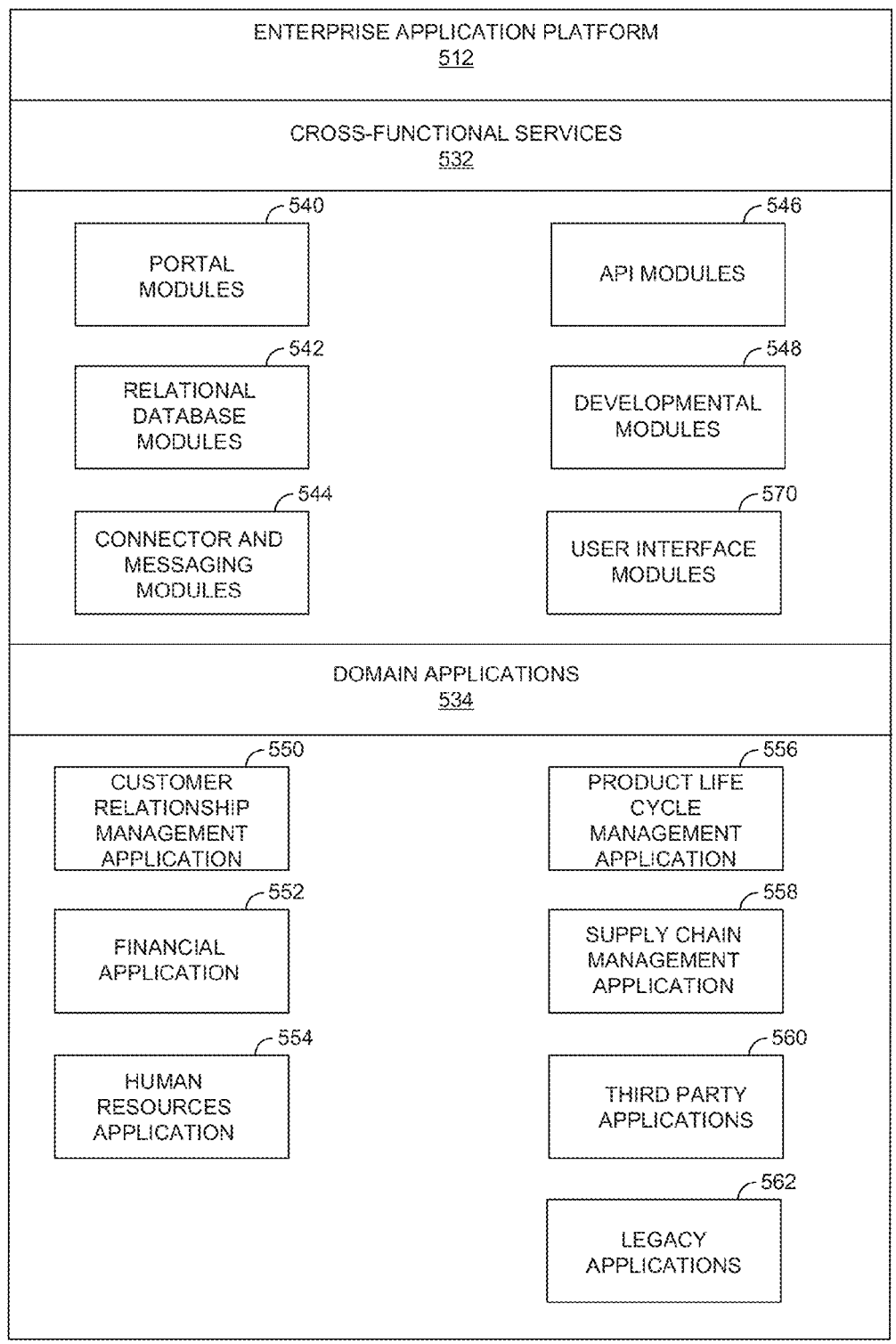
FIG. 6 is a schematic block diagram illustrating the architecture of modules, services, and applications forming part of an enterprise application system according to an example embodiment.

FIG. 6 is a block diagram illustrating enterprise applications and services as embodied in the enterprise application platform 512, according to an example embodiment. The enterprise application platform 512 includes cross-functional services 532 and domain applications 534. The cross-functional services 532 include portal modules 540, relational database modules 542, connector and messaging modules 544, Application Program Interface (API) modules 546 development modules 548, and user interface modules 570. The user interface modules 570 may include the interface module 122, the user input module 124, the output preview module 126, the template module 128, the print preview module 140, the fax preview module 142, and the e-mail preview module 144, as discussed above with reference to the computer system 100 of FIG. 1. In other embodiments, these user interface modules 570 may form part of the portal modules 540.

The portal modules 540 enable a single point of access to other cross-functional services 532 and domain applications 534 for the client machine 516, the small device client machine 522 and the client/server machine 517. The portal modules 540, in cooperation with the user interface modules 570, are utilized to process, author and maintain web pages that present content (e.g., user interface elements and navigational controls) to the user. In addition, the portal modules 540 enable user roles, a construct that associates a role with a specialized environment that is utilized by a user to execute tasks, utilize services and exchange information with other users and within a defined scope. For example, the role determines the content that is available to the user and the activities that the user may perform. In addition the portal modules 540 comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 542 provide support services for access to the database 530, that may include a user interface library. The database(s) 110 may include application data 112 and template data 114 as described above with reference to FIG. 1. The relational database modules 542 provide support for object relational mapping, database independence and distributed computing. The relational database modules 542 are utilized to add, delete, update and manage database elements. In addition the relational database modules 542 comply with database standards and/or utilize a variety of database technologies including SQL, SQLDBC, Oracle, MySQL, SAP MaxDB, JDBC The connector and messaging modules 544 enable communication across different types of messaging systems that are utilized by the cross-functional services 532 and the domain applications 534 by providing a common messaging application processing interface. The connector and messaging modules 544 enable asynchronous communication on the enterprise application platform 512.

The Application Program Interface (API) modules 546 enable the development of service-based applications by exposing an interface to existing and new applications as services. Repositories are included in the platform as a central place to find available services when building applications.

The development modules 548 provide a development environment for the addition, integration, updating and extension of software components on the enterprise application platform 512 without impacting existing cross-functional services 532 and domain applications 534.

Turning to the domain applications 534, the customer relationship management applications 550 enable access to and facilitates collecting and storing of relevant personalized information from multiple data sources and business processes. Enterprise personnel that are tasked with developing a buyer into a long-term customer may utilize the customer relationship management applications 550 to provide assistance to the buyer throughout a customer engagement cycle.

Enterprise personnel may utilize the financial applications 552 and business processes to track and control financial transactions within the enterprise application platform 512. The financial applications 552 facilitate the execution of operational, analytical and collaborative tasks that are associated with financial management. Specifically, the financial applications 552 enable the performance of tasks related to financial accountability, planning, forecasting, and managing the cost of finance.

The human resource applications 554 may be utilized by enterprise personal and business processes to manage, deploy, and track enterprise personnel. Specifically, the human resource applications 554 enable the analysis of human resource issues and facilitate human resource decisions based on real time information.

The product life cycle management applications 556 enable the management of a product throughout the life cycle of the product. For example, the product life cycle management applications 556 enable collaborative engineering, custom product development, project management, asset management and quality management among business partners.

The supply chain management applications 558 enable monitoring of performances that are observed in supply chains. The supply chain management applications 558 facilitate adherence to production plans and on-time delivery of products and services.

The third party applications 560, as well as legacy applications 562, may be integrated with domain applications 534 and utilize cross-functional services 532 on the enterprise application platform 512.

Figure 7:
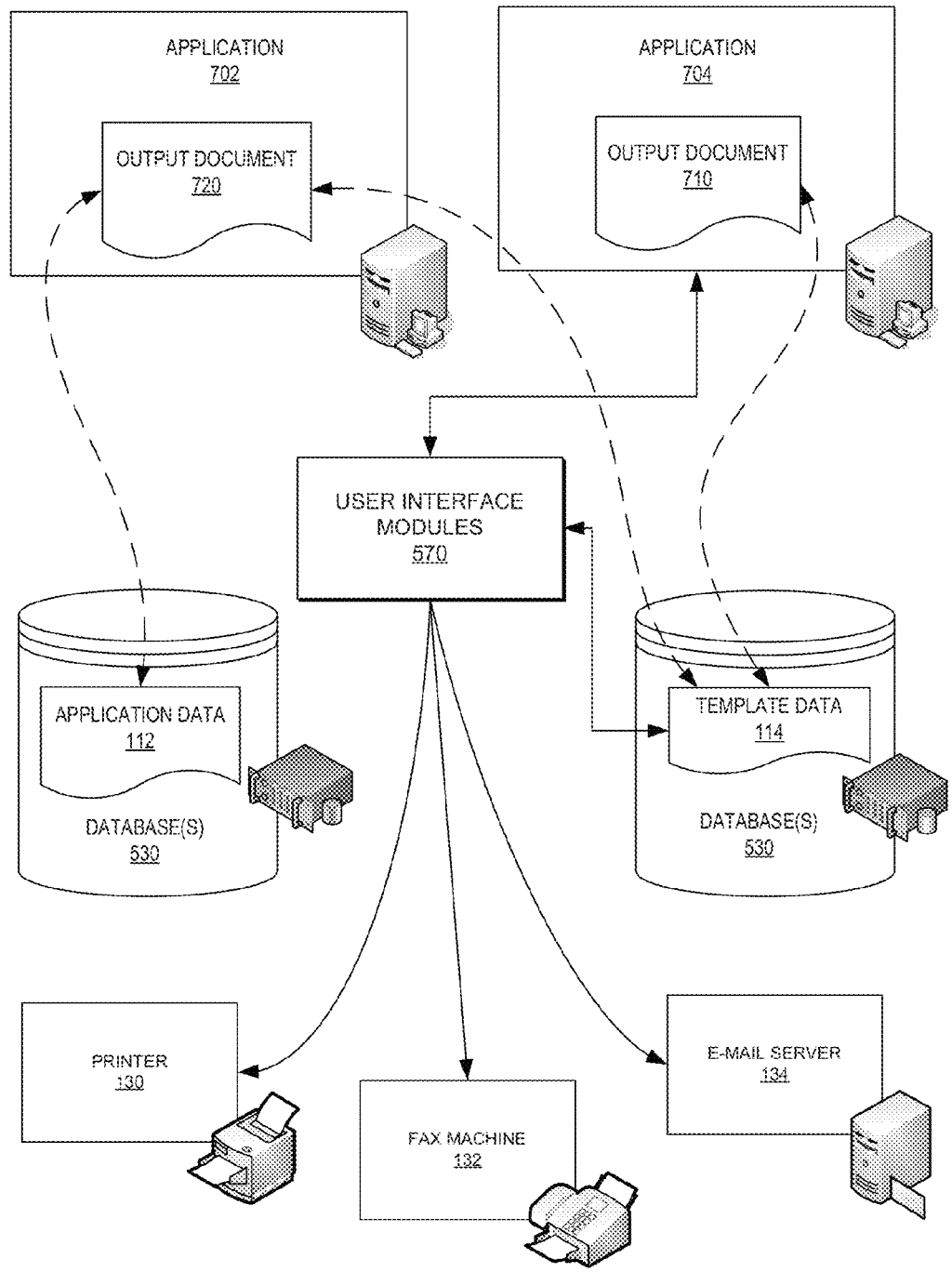
FIG. 7 is a schematic diagram illustrating the use across applications of user interface modules providing template functionality for output preview.

FIG. 7 is a schematic illustration of the use of template documents or output preview templates across applications in the system 510 described with reference to FIG. 5. The user interface modules 570 forming part of the enterprise platform 512 may be accessed to provide associated functionalities to two separate applications, schematically indicated as applications 702 and 704 in FIG. 7.

For example, an output document 710 may be created by a user of an application 704 and e.g. client machine 16. The output document 710 may be saved as an output template, or template document, by the user's clicking on the "Save As Template" soft button 328 forming part of the print preview tray 330 (see e.g. FIG. 3E). A data structure representative of the output template corresponding to the output document 710 is saved as template data 114 in one of the databases 530. As described above, the template data 114 may comprise a markup language data structure, such as XML code including XML placeholders identifying respective types of screen items, and may further include information regarding the positioning, size, and/or formatting of the respective screen items.

Such a saved template document may be applied in another application such as application 702. When the saved template document is selected in application 702, the template data 114 is accessed and is loaded in an output preview tray, such as the print preview tray 330 (FIG. 3E). Preview items in such an output preview tray are rendered based on screen item data of associated screen items of a user interface of the application 702 in which the template document is loaded, the screen item data being retrieved from application data 112 associated with the application 702 in which the template is loaded. For example, an XML data structure may be populated with screen item date underlying screen items of application 702. In other words, a template data structure created and saved via a first application 704 may be implemented in a second application 702, being populated screen item data relevant to the second application 702. The respective applications 702, 704 in the example embodiment may be executed on a single machine, or may, in another embodiment be executed on separate client machines.

Figure 8:
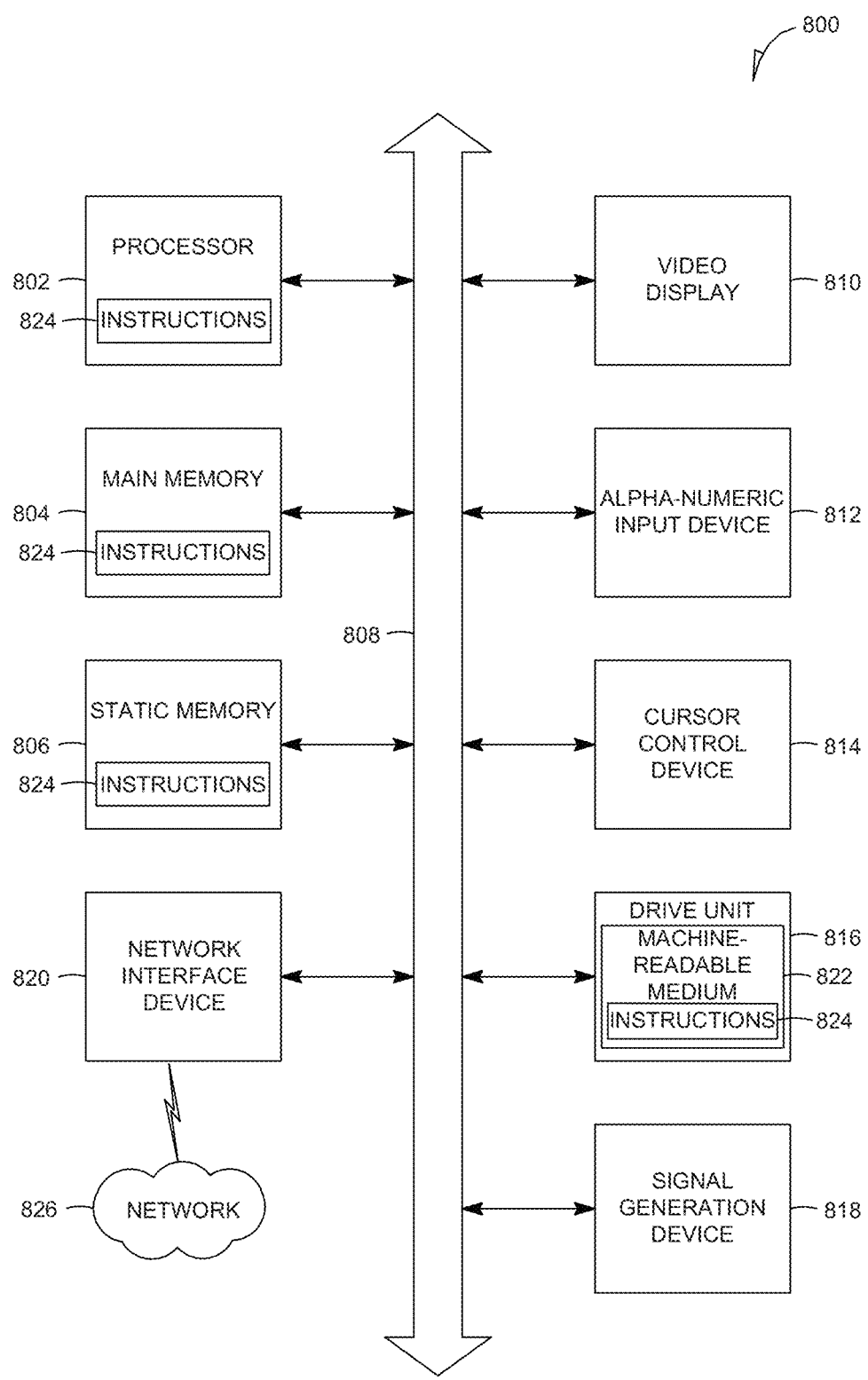
FIG. 8 is a block diagram of a machine in the example form of a computer system within which a set of instructions, for causing the machine to perform any one or more of the methodologies discussed herein, may be executed.

FIG. 8 shows a diagrammatic representation of a machine in the example form of a computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" or "computer-readable medium" shall be taken to include any tangible non-transitory medium which is capable of storing or encoding a sequence of instructions for execution by the machine and that cause the machine to perform any one of the methodologies.

Although specific example embodiments have been described, it will be evident that various modifications and changes may be made to these embodiments without departing from the broader spirit and scope of the method and system. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
generating a user interface for an application based on application data associated with the application, the user interface including a plurality of screen items, each screen item being rendered based on associated screen item data and being linked to the screen item data, the linked screen item data being part of the application data;
displaying a preview area simultaneously with the user interface;
adding at least one preview item to an output preview in response to receiving user input indicative of an addition of a corresponding screen item of the plurality of screen items; and
within the preview area, generating the output preview which includes the at least one preview item representative of the corresponding screen item of the plurality of screen items, the at least one preview item being linked to the screen item data associated with the corresponding screen item and being rendered in the output preview based on the linked screen item data, the output preview being one of a print preview, a fax preview, and an e-mail preview, the output preview being a reduced size preview of an output page.

2. The method of claim 1, wherein generating the output preview is in response to receiving user input indicative of a selected output mode, the output preview being with respect to the selected output mode.

3. The method of claim 2, wherein the user interface includes a plurality of output mode objects associated with respective output modes, the user input indicative of the selected output mode comprising a drag operation of a selected screen item and a drop operation of the selected screen item on the output mode object associated with the selected output mode.

4. The method of claim 1, wherein the output preview is provided in an output preview tray forming part of the user interface, wherein adding preview items to the output preview is in response to receiving user input indicative of the addition of corresponding screen items to the output preview tray.

5. The method of claim 4, wherein the output preview is editable, permitting user rearrangement of relative positioning of a plurality of preview items in the output preview.

6. The method of claim 5, further comprising receiving user inputted text in the output preview tray, and generating the user inputted text as part of the output preview.

7. The method of claim 1, wherein the user interface is a markup language-based user interface, the method further comprising automatically generating an output document in response to user selection for output of one of the plurality of screen items, the output document including the selected screen item, and the output preview being with respect to the output document.

8. The method of claim 1, further comprising re-rendering the at least one preview item subsequent to initial rendering of the at least one preview item, the re-rendering being based on a current form of the linked screen item data.

9. The method of claim 1, further comprising storing the output preview as an output template, to permit future application of the output template to another user interface.

10. The method of claim 1, wherein generating the output preview is in response to user selection of an output template, the at least one preview item being linked to the screen item data associated with the corresponding screen item by a data structure provided in the output template.

11. A system comprising:
an interface module to generate a user interface for an application based on application data associated with the application, the user interface including a plurality of screen items, each screen item being rendered based on associated screen item data and being linked to the screen item data, the linked screen item data being part of the application data; and
an output preview module to:
display a preview area simultaneously with the user interface,
add at least one preview item to an output preview in response to receiving user input indicative of an addition of a corresponding screen item of the plurality of screen items, and
within the preview area, generate the output preview which includes the at least one preview item representative of the corresponding screen item of the plurality of screen items, the at least one preview item being linked to the screen item data associated with the corresponding screen item and being rendered in the output preview based on the linked screen item data, the output preview being one of a print preview, a fax preview, and an e-mail preview, the output preview being a reduced size preview of an output page.

12. The system of claim 11, wherein the output preview module is to display the output preview in response to receiving user input indicative of a selected output mode, the output preview being with respect to the selected output mode.

13. The system of claim 12, wherein the user interface includes a plurality of output mode objects associated with respective output modes, the user input indicative of the selected output mode comprising dragging a selected screen item and dropping the selected screen item on the output mode object associated with the selected output mode.

14. The system of claim 11, wherein the output preview module is to provide the output preview in an output preview tray forming part of the user interface, the output preview module to add preview items to the output preview in response to receiving user input indicative of the addition of corresponding screen items to the output preview tray.

15. The system of claim 14, wherein the output preview is editable, permitting user rearrangement of relative positioning of a plurality of preview items in the output preview.

16. The system of claim 15, wherein the output preview module is to receive user inputted text in the output preview tray, and to display user inputted text as part of the output preview.

17. The system of claim 11, wherein the user interface is a markup language-based user interface, the output preview module to automatically generate an output document in response to user selection for output of one of the plurality of screen items, the output document including the selected screen item, and the output preview being with respect to the output document.

18. The system of claim 11, wherein the output preview module is to re-render the at least one preview item subsequent to initial rendering of the at least one preview item, the re-rendering being based on a current form of the linked screen item data.

19. The system of claim 11, further comprising a template module to store the output preview as an output template, to permit future application of the output template to another user interface.

20. The system of claim 11, wherein the output preview module is to generate the output preview in response to user selection of an output template via a template module, the at least one preview item being linked to the screen item data associated with the corresponding screen item by a data structure provided in the output template.

21. A machine-readable storage medium storing instructions which, when performed by a machine, cause the machine to:
generate a user interface for an application based on the application data associated with the application, the user interface including a plurality of screen items, each screen item being rendered based on associated screen item data and being linked to the screen item data, the linked screen item data being part of the application data;
displaying a preview area simultaneously with the user interface;
add at least one preview item to an output preview in response to receiving user input indicative of an addition of a corresponding screen item of the plurality of screen items; and
within the preview area, generate the output preview which includes the at least one preview item representative of the corresponding screen item of the plurality of screen items, the at least one preview item being linked to the screen item data associated with the corresponding screen item and being rendered in the output preview based on the linked screen item data, the output preview being one of a print preview, a fax preview, and an e-mail preview, the output preview being a reduced size preview of an output page.

22. A system comprising:
means for generating on a screen a user interface for an application based on the application data associated with the application, the user interface including a plurality of screen items, each screen item being rendered based on associated screen item data and being linked to the screen item data, the linked screen item data being part of the application data;
means for displaying a preview area simultaneously with the user interface;
means for adding at least one preview item to an output preview in response to receiving user input indicative of an addition of a corresponding screen item of the plurality of screen items; and means for generating, within the preview area, the output preview which includes the at least one preview item representative of the corresponding screen item of the plurality of screen items, the at least one preview item being linked to the screen item data associated with the corresponding screen item and being rendered in the output preview based on the linked screen item data, the output preview being one of a print preview, a fax preview, and an e-mail preview, the output preview being a reduced size preview of an output page.

* * * * *